(12) United States Patent
Lockton

(10) Patent No.: US 8,705,195 B2
(45) Date of Patent: Apr. 22, 2014

(54) SYNCHRONIZED GAMING AND PROGRAMMING

(75) Inventor: David B. Lockton, Menlo Park, CA (US)

(73) Assignee: Winview, Inc., Carmel, CA (US)

( * ) Notice: Subject to any disclaimer, the term of this patent is extended or adjusted under 35 U.S.C. 154(b) by 0 days.

(21) Appl. No.: 13/484,129

(22) Filed: May 30, 2012

(65) Prior Publication Data

US 2012/0295686 A1 Nov. 22, 2012

Related U.S. Application Data

(63) Continuation-in-part of application No. 13/403,845, filed on Feb. 23, 2012, which is a continuation-in-part of application No. 11/786,992, filed on Apr. 12, 2007, now Pat. No. 8,149,530.

(60) Provisional application No. 60/791,793, filed on Apr. 12, 2006.

(51) Int. Cl.
*G11B 5/09* (2006.01)

(52) U.S. Cl.
USPC ............... 360/65; 381/103; 463/40; 463/41; 463/42

(58) Field of Classification Search
USPC .................. 360/65, 51; 381/103; 370/260; 463/40–42
See application file for complete search history.

(56) References Cited

U.S. PATENT DOCUMENTS

| | | |
|---|---|---|
| 4,141,548 A | 2/1979 | Everton |
| 4,270,755 A | 6/1981 | Willhide et al. |
| 4,496,148 A | 1/1985 | Morstain et al. |
| 4,592,546 A | 6/1986 | Fascenda et al. |
| 4,816,904 A | 3/1989 | McKenna et al. |
| 5,013,038 A | 5/1991 | Luvenberg |
| 5,035,422 A | 7/1991 | Berman |
| 5,073,931 A | 12/1991 | Audebert et al. |
| 5,083,271 A | 1/1992 | Thacher et al. |
| 5,083,800 A | 1/1992 | Lockton |
| 5,120,076 A | 6/1992 | Luxenberg et al. |
| 5,213,337 A | 5/1993 | Sherman |
| 5,227,874 A | 7/1993 | Von Kohorn |
| 5,263,723 A | 11/1993 | Pearson et al. |

(Continued)

FOREIGN PATENT DOCUMENTS

| | | |
|---|---|---|
| CA | 2252021 | 11/1998 |
| CA | 2252074 | 11/1998 |

(Continued)

OTHER PUBLICATIONS

"Two Way TV Patent and Filing Map" www.twowaytv.com/version4/technologies/tech_patents.asp.

(Continued)

*Primary Examiner* — Masud Ahmed

(74) *Attorney, Agent, or Firm* — Haverstock & Owens LLP

(57) ABSTRACT

To encourage viewer participation, games, contests and social interactions are able to be synchronized with programming such as television shows or commercials utilizing a second screen such as a cell phone, iPad® or laptop computer. The programming is able to be television programming, Internet programming (e.g. a video displayed on a webpage or mobile device) or any other programming. The gaming is able to be any game such as a game of skill or chance, for example, a scavenger hunt or a treasure hunt.

38 Claims, 6 Drawing Sheets

(56) References Cited

U.S. PATENT DOCUMENTS

| | | | |
|---|---|---|---|
| 5,283,734 A | 2/1994 | Von Kohorn | |
| 5,343,236 A | 8/1994 | Koppe et al. | |
| 5,343,239 A | 8/1994 | Lappington et al. | |
| 5,462,275 A | 10/1995 | Lowe et al. | |
| 5,479,492 A | 12/1995 | Hofstee et al. | |
| 5,553,120 A | 9/1996 | Katz | |
| 5,566,291 A | 10/1996 | Boulton et al. | |
| 5,585,975 A * | 12/1996 | Bliss | 360/65 |
| 5,586,257 A | 12/1996 | Perlman | |
| 5,589,765 A | 12/1996 | Ohmart et al. | |
| 5,643,088 A | 7/1997 | Vaughn et al. | |
| 5,759,101 A | 6/1998 | Von Kohorn | |
| 5,761,606 A | 6/1998 | Wolzien | |
| 5,762,552 A | 6/1998 | Vuong et al. | |
| 5,764,275 A | 6/1998 | Lappington et al. | |
| 5,813,913 A | 9/1998 | Berner et al. | |
| 5,838,774 A | 11/1998 | Weisser, Jr. | |
| 5,860,862 A | 1/1999 | Junkin | |
| 5,870,683 A | 2/1999 | Wells et al. | |
| 5,916,024 A | 6/1999 | Von Kohom | |
| 5,970,143 A | 10/1999 | Schneier et al. | |
| 5,971,854 A | 10/1999 | Pearson et al. | |
| 5,987,440 A | 11/1999 | O'Neil et al. | |
| 6,016,337 A | 1/2000 | Pykalisto | |
| 6,117,013 A | 9/2000 | Elba | |
| 6,126,543 A | 10/2000 | Friedman | |
| 6,174,237 B1 | 1/2001 | Stephenson | |
| 6,182,084 B1 | 1/2001 | Cockrell et al. | |
| 6,193,610 B1 | 2/2001 | Junkin | |
| 6,222,642 B1 | 4/2001 | Farrell et al. | |
| 6,233,736 B1 | 5/2001 | Wolzien | |
| 6,251,017 B1 | 6/2001 | Leason et al. | |
| 6,293,868 B1 | 9/2001 | Bernard | |
| 6,312,336 B1 | 11/2001 | Handelman et al. | |
| 6,416,414 B1 | 7/2002 | Stadelmann | |
| 6,425,828 B2 | 7/2002 | Walker et al. | |
| 6,434,398 B1 | 8/2002 | Inselberg | |
| 6,524,189 B1 | 2/2003 | Rautila | |
| 6,530,082 B1 | 3/2003 | Del Sesto et al. | |
| 6,578,068 B1 | 6/2003 | Bowman-Amuah | |
| 6,594,098 B1 * | 7/2003 | Sutardja | 360/65 |
| 6,604,997 B2 | 8/2003 | Saidakovsky et al. | |
| 6,610,953 B1 | 8/2003 | Tao et al. | |
| 6,648,760 B1 | 11/2003 | Nicastro | |
| 6,659,860 B1 | 12/2003 | Yamamoto et al. | |
| 6,659,872 B1 | 12/2003 | Kaufman et al. | |
| 6,690,661 B1 | 2/2004 | Agarwal et al. | |
| 6,718,350 B1 | 4/2004 | Karbowski | |
| 6,752,396 B2 | 6/2004 | Smith | |
| 6,758,754 B1 | 7/2004 | Lavanchy et al. | |
| 6,760,595 B2 | 7/2004 | Insellberg | |
| 6,763,377 B1 | 7/2004 | Belknap et al. | |
| 6,774,926 B1 | 8/2004 | Ellis et al. | |
| 6,785,561 B1 | 8/2004 | Kim | |
| 6,801,380 B1 * | 10/2004 | Sutardja | 360/65 |
| 6,807,675 B1 | 10/2004 | Maillard et al. | |
| 6,811,482 B2 | 11/2004 | Letovsky | |
| 6,817,947 B2 | 11/2004 | Tanskanen | |
| 6,824,469 B2 | 11/2004 | Allibhoy et al. | |
| 6,840,861 B2 | 1/2005 | Jordan et al. | |
| 6,846,239 B2 | 1/2005 | Washio | |
| 6,857,122 B1 | 2/2005 | Takeda et al. | |
| 6,863,610 B2 | 3/2005 | Vancraeynest | |
| 6,871,226 B1 | 3/2005 | Ensley et al. | |
| 6,884,172 B1 | 4/2005 | Lloyd et al. | |
| 6,887,159 B2 | 5/2005 | Leen et al. | |
| 6,893,347 B1 | 5/2005 | Zilliacus et al. | |
| 6,942,574 B1 | 9/2005 | LeMay et al. | |
| 6,960,088 B1 | 11/2005 | Long | |
| 7,035,653 B2 | 4/2006 | Simon et al. | |
| 7,169,050 B1 | 1/2007 | Tyler | |
| 7,194,758 B1 | 3/2007 | Waki et al. | |
| 7,254,605 B1 | 8/2007 | Strum | |
| 7,288,027 B2 | 10/2007 | Overton | |
| 7,347,781 B2 | 3/2008 | Schultz | |
| 7,351,149 B1 | 4/2008 | Simon et al. | |
| 7,379,705 B1 | 5/2008 | Rados et al. | |
| 7,502,610 B2 | 3/2009 | Maher | |
| 7,517,282 B1 | 4/2009 | Pryor | |
| 7,907,211 B2 | 3/2011 | Oostveen et al. | |
| 8,006,314 B2 | 8/2011 | Wold | |
| 8,082,150 B2 | 12/2011 | Wold | |
| 8,086,445 B2 | 12/2011 | Wold et al. | |
| 8,107,674 B2 | 1/2012 | Davis et al. | |
| 8,176,518 B1 | 5/2012 | Junkin et al. | |
| 2001/0004609 A1 | 6/2001 | Walker et al. | |
| 2001/0005670 A1 | 6/2001 | Lahtinen | |
| 2001/0020298 A1 | 9/2001 | Rector, Jr. et al. | |
| 2002/0010789 A1 | 1/2002 | Lord | |
| 2002/0042293 A1 | 4/2002 | Ubale et al. | |
| 2002/0054088 A1 | 5/2002 | Tanskanen et al. | |
| 2002/0056089 A1 | 5/2002 | Houston | |
| 2002/0059623 A1 | 5/2002 | Rodriguez et al. | |
| 2002/0078176 A1 | 6/2002 | Nomura et al. | |
| 2002/0108125 A1 | 8/2002 | Joao | |
| 2002/0108127 A1 | 8/2002 | Lew et al. | |
| 2002/0124247 A1 | 9/2002 | Houghton | |
| 2002/0157002 A1 | 10/2002 | Messerges et al. | |
| 2002/0159576 A1 | 10/2002 | Adams | |
| 2002/0162031 A1 | 10/2002 | Levin et al. | |
| 2002/0177483 A1 | 11/2002 | Cannon | |
| 2003/0013528 A1 | 1/2003 | Allibhoy et al. | |
| 2003/0040363 A1 | 2/2003 | Sandberg | |
| 2003/0069828 A1 | 4/2003 | Blazey et al. | |
| 2003/0070174 A1 | 4/2003 | Solomon | |
| 2003/0078924 A1 | 4/2003 | Liechty et al. | |
| 2003/0144017 A1 | 7/2003 | Inselberg | |
| 2003/0154242 A1 | 8/2003 | Hayes et al. | |
| 2003/0177504 A1 | 9/2003 | Paulo et al. | |
| 2003/0212691 A1 | 11/2003 | Kuntala et al. | |
| 2003/0216185 A1 | 11/2003 | Varley | |
| 2004/0014524 A1 | 1/2004 | Pearlman | |
| 2004/0022366 A1 | 2/2004 | Ferguson et al. | |
| 2004/0060063 A1 | 3/2004 | Russ et al. | |
| 2004/0088729 A1 | 5/2004 | Petrovic et al. | |
| 2004/0093302 A1 | 5/2004 | Baker et al. | |
| 2004/0117831 A1 | 6/2004 | Ellis et al. | |
| 2004/0117839 A1 | 6/2004 | Watson et al. | |
| 2004/0148638 A1 | 7/2004 | Weisman et al. | |
| 2004/0152454 A1 | 8/2004 | Kauppinen | |
| 2004/0158855 A1 | 8/2004 | Gu et al. | |
| 2004/0178923 A1 | 9/2004 | Kuang | |
| 2004/0198495 A1 | 10/2004 | Cisneros et al. | |
| 2004/0203667 A1 | 10/2004 | Schroeder et al. | |
| 2004/0203898 A1 | 10/2004 | Bodin et al. | |
| 2004/0224750 A1 | 11/2004 | Al-Ziyoud | |
| 2004/0242321 A1 | 12/2004 | Overton | |
| 2005/0026699 A1 | 2/2005 | Kinzer et al. | |
| 2005/0060219 A1 | 3/2005 | Deitering et al. | |
| 2005/0076371 A1 | 4/2005 | Nakamura | |
| 2005/0097599 A1 | 5/2005 | Plotnick et al. | |
| 2005/0101309 A1 | 5/2005 | Croome | |
| 2005/0113164 A1 | 5/2005 | Buecheler et al. | |
| 2005/0131984 A1 | 6/2005 | Hofmann et al. | |
| 2005/0210526 A1 | 9/2005 | Levy et al. | |
| 2005/0235043 A1 | 10/2005 | Teodosiu et al. | |
| 2005/0255901 A1 | 11/2005 | Kreutzer | |
| 2005/0266869 A1 | 12/2005 | Jung | |
| 2005/0273804 A1 | 12/2005 | Preisman | |
| 2005/0288812 A1 | 12/2005 | Cheng et al. | |
| 2006/0025070 A1 | 2/2006 | Kim et al. | |
| 2006/0047772 A1 | 3/2006 | Crutcher | |
| 2006/0059161 A1 | 3/2006 | Millett et al. | |
| 2006/0089199 A1 | 4/2006 | Jordan et al. | |
| 2006/0135253 A1 | 6/2006 | George et al. | |
| 2006/0148569 A1 | 7/2006 | Beck | |
| 2006/0156371 A1 | 7/2006 | Maetz et al. | |
| 2006/0174307 A1 | 8/2006 | Hwang et al. | |
| 2006/0205483 A1 | 9/2006 | Meyer et al. | |
| 2006/0269120 A1 | 11/2006 | Mehmadi et al. | |
| 2007/0004516 A1 | 1/2007 | Jordan et al. | |
| 2007/0019826 A1 * | 1/2007 | Horbach et al. | 381/103 |
| 2007/0083920 A1 | 4/2007 | Mizoguchi et al. | |
| 2007/0174870 A1 | 7/2007 | Nagashima et al. | |

(56) References Cited

U.S. PATENT DOCUMENTS

| | | |
|---|---|---|
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2008/0076497 A1 | 3/2008 | Kiskis et al. |
| 2008/0270288 A1 | 10/2008 | Butterly et al. |
| 2008/0288600 A1 | 11/2008 | Clark |
| 2009/0163271 A1 | 6/2009 | George et al. |
| 2009/0234674 A1 | 9/2009 | Wurster |
| 2010/0099421 A1 | 4/2010 | Patel et al. |
| 2010/0099471 A1 | 4/2010 | Feeney et al. |

FOREIGN PATENT DOCUMENTS

| | | |
|---|---|---|
| CA | 2279069 | 7/1999 |
| CA | 2287617 | 10/1999 |
| EP | 0 649 102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1998 |
| WO | 01/65743 A1 | 9/2001 |
| WO | 02/003698 A1 | 10/2002 |

OTHER PUBLICATIONS

"Ark 4.0 Standard Edition, Technical Overview" www.twowaytv.com/version4/technologies/tech_ark_professional.asp.

"Understanding the Interactivity Between Television and Mobile Commerce", Robert Davis and David Yung, Communications of the ACM, Jul. 2005, vol. 48, No. 7, pp. 103-105.

"Re: Multicast Based Voting System" www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modelling User Behavior in Networked Games by Tristan Henderson and Saleem Bhatti", www.woodworm.cs.uml.edu/rprice/ep/henderson.

"SMS Based Voting and Survey System for Meetings", www.abbit.be/technology/SMSSURVEY.htm.

"PurpleAce Launches 3GSM Ringtone Competition", www.wirelessdevnet.com/news/2005/jan/31/news6html.

"On the Performance of Protocols for collecting Responses over a Multiple-Access Channel", Mostafa H. Ammar and George N. Rouskas, IEEE INFORCOM '91, pp. 1490-1499, vol. 3, IEEE, New York, NY.

Merriam-Webster, "Game" definition, <http://www.merriam-webster.com/dictionary/agme>p. 1.

Ducheneaut et al., "The Social Side of Gaming: A Study of Interaction Patterns in a Massively Multiplayer Online Game", Palo Alto Research Center, Nov. 2004, vol. 6, Issue 4, pp. 360-369.

\* cited by examiner

SYNCHRONIZED GAMING AND PROGRAMMING

RELATED APPLICATION(S)

This patent application is a continuation-in-part of U.S. patent application Ser. No. 13/403,845, filed Feb. 23, 2012, titled, "A METHODOLOGY FOR EQUALIZING SYSTEMIC LATENCIES IN TELEVISION RECEPTION IN CONNECTION WITH GAMES OF SKILL PLAYED IN CONNECTION WITH LIVE TELEVISION PROGRAMMING" which is a continuation of co-pending of U.S. patent application Ser. No. 11/786,992, filed Apr. 12, 2007, titled, "A METHODOLOGY FOR EQUALIZING SYSTEMIC LATENCIES IN TELEVISION RECEPTION IN CONNECTION WITH GAMES OF SKILL PLAYED IN CONNECTION WITH LIVE TELEVISION PROGRAMMING," which claims priority under 35 U.S.C. §119(e) of the co-owned U.S. Provisional Patent Application No. 60/791,793, filed Apr. 12, 2006, and titled "A METHODOLOGY FOR EQUALIZING SYSTEMIC LATENCIES IN TELEVISION RECEPTION IN CONNECTION WITH GAMES OF SKILL PLAYED IN CONNECTION WITH LIVE TELEVISION PROGRAMMING" which are also all hereby incorporated by reference in their entireties.

FIELD OF THE INVENTION

The present invention relates to the field of distributed gaming. More specifically, the present invention relates to the field of distributed gaming utilizing a mobile device.

BACKGROUND OF THE INVENTION

In the United States alone there are over 170 million registered cellular phones. With the expiration of the U.S. Pat. No. 4,592,546 to Fascenda and Lockton, companies are able to now use the cellular phone and other mobile communication devices utilizing a multicast network to control television viewers in games of skill based upon predicting, for example, what the quarterback may call on the next play within a football game. Both prime time and programs syndicated on a market-by-market basis lend themselves to games of skill. In addition, games of skill with a common start time can be conducted simultaneously among cellular phone owners, based on classic card, dice, trivia, and other games. In order to avoid the anti-gaming laws in the various states, the winners must be determined by the relative skill, experience and practice of the player in each discrete game.

U.S. Pat. No. 5,813,913 ('913) to Berner and Lockton provides for a central computing system which includes a means of grouping participants having similar skill levels together in simultaneous, but separate, levels of competition playing an identical game. The relative performances are communicated to only those participants competing at the same skill level. The '913 patent also provides for a wireless receiving device to permanently store the specific skill level for each participant for each type of common event such as those based on televised sports or game shows. The '913 patent provides for a telephonic link at the completion of the game to collect information and update the skill level of the participants of a particular game. When a person achieves sufficient points or meets other objective criteria to graduate into another skill level, a method is provided for accomplishing this in the central computer and then transmitting an alert to the participant notifying them of their promotion. The '913 patent describes awarding prizes and providing recognition for the members of each discreet skill level in a common game. All users, no matter what level they are on, receive the same number of questions and thus the possibility of earning the same number of points. Thus direct comparisons between users at different levels, although not encouraged are possible. Such comparisons between players of disparate skills can lead to user discouragement.

Games of skill and chance have an intrinsic excitement and entertainment value. Any game is greatly enhanced by a participant's ability to know how their performance compares in relation to other participants and/or to historical performance for the game throughout the contest. As with any game of skill, competition among friends, or with strangers of similar experience, or the ability at ones option, sometimes for an extra consideration, to compete in a separate team or individual contest, offers the opportunity of increased enjoyment and prizes.

Games of skill that rely on participation by watching an event on a television have potential latency issues since television signal reception is not synchronized nationwide. For example, a participant in Texas using a satellite dish network may experience a 3 second delay compared to an individual in California using a cable network. Also, there are delays between individuals attending a game live and those watching the game live on television. Furthermore, for taped programs, both those shown to viewers in time zones or those syndicated on a market-by-market basis, there are potential delay issues as experienced with the live broadcasts in addition to other possible differences in timing of the broadcasts. Therefore, to maintain user enjoyment and fairness for all participants, these delays must be neutralized.

SUMMARY OF THE INVENTION

To encourage viewer participation, games, contests and social interactions are able to be synchronized with programming such as television shows or commercials utilizing a second screen such as a cell phone, iPad® or laptop computer. The programming is able to be television programming, Internet programming (e.g. a video displayed on a webpage or mobile device) or any other programming. The gaming is able to be any game such as a game of skill or chance, for example, a scavenger hunt or a treasure hunt.

DETAILED DESCRIPTION OF THE PREFERRED EMBODIMENT

Figure 1:
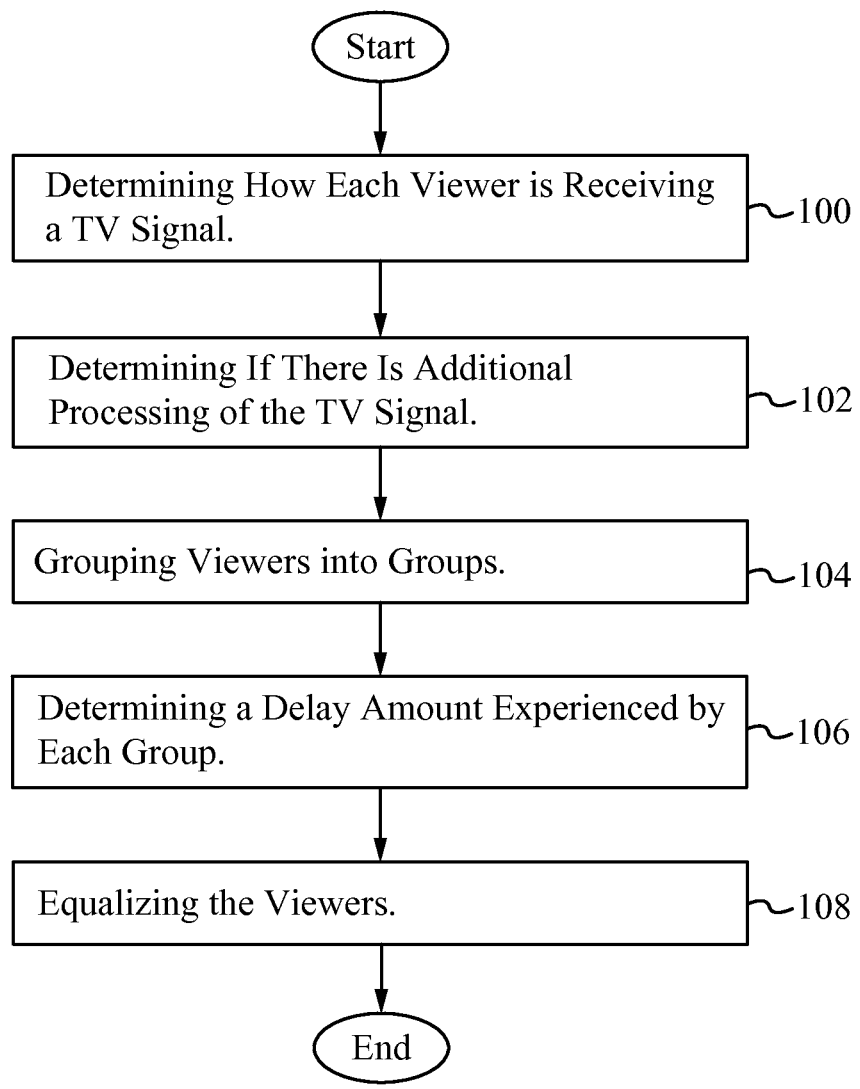
FIG. 1 illustrates a flowchart of a process of preventing latency issues from giving an advantage to some participants.

U.S. Provisional Patent Application No. 60/692,356, filed Jun. 20, 2005, and entitled "SYSTEMS AND METHOD- OLOGIES ENABLING A CELL PHONE BASED SUBSCRIPTION SERVICE OFFERING A VARIETY OF SCHEDULED GAMES IN CONNECTION WITH LIVE TELEVISION PROGRAMMING," is incorporated by reference herein.

Three separate classes of latency issues for the length of time it takes a television signal to reach a viewer in producing real-time entertainment such as games of skill synchronized with television programming are addressed. The latency issues are: 1) systemic propagation delays in the delivery of a television signal to a receiver, 2) arbitrarily imposed delays of a broadcast television signal and 3) variances in precise broadcast times of segments of taped television programs between local and national commercials, sold through syndication to individual television stations.

Systemic Propagation Delays

There are specific challenges facing a service comprised of games or other entertainment played by remote participants utilizing cellular phones or the Internet, in connection with a live or taped telecast. Examples are live baseball, basketball and football games, taped game shows such as Wheel of Fortune™ and Jeopardy™ or other television programming such as predicting the winners of the Oscars. In a game of skill, for example, fair competition necessitates that a fast paced game, based on the unfolding television action has a level playing field for all participants regardless of how they receive their television signal. Propagation delays result from, among other things, the number of satellite hops required to deliver the signal, the method of processing and rebroadcasting the signal after it is received by cable systems head ends or an over the air broadcast television station, and whether or not the signal is further processed for high definition television. Furthermore, digital television recording systems (DVRs) such as TiVo™ are also able to generate delays in the viewing of the picture after receipt via satellite or cable. These delays are able to result in a difference between the first signal received and the last received of more than several seconds.

People have an unsatisfactory experience and/or others are able to gain a potential competitive advantage from the variances in the exact time one viewer sees an event on their television versus another competitor who receives their television signal through a different delivery path. In the U.S., the 120 million television homes receive their signal either through an over the air broadcast, cable system or via satellite delivery. Each delivery system can impose propagation delays of various time lengths. If the delay between the time a viewer with the least amount of delay and the person receiving the signal with the greatest amount of delay exceeds several seconds, some inequalities in game experience and play are able to result.

One example is a game is based upon a football telecast, wherein competitors predict the play that the coaches and/or quarterback call prior to the snap of the ball. The competitor's prediction is based among other things on their observation of the down, distance and the offensive and defensive formations on the field and tendencies of the teams in these situations. Such a game utilizes a "lock out" signal, as described in the U.S. Pat. No. 4,592,546 to Fascenda, entitled "Game of Skill Playable by Remote Participants in Conjunction with a Live Event," which is incorporated by reference herein, to prohibit the entry of predictions after the competitor sees the play begin to unfold, at the snap of the ball. The time stamped "lock out" signal is generated by a game producer also viewing the same telecast from a different location. If the game producer is viewing a television signal several seconds before some competitors and generating a time stamp based on that event, an advantage is able to result if the difference in the time stamp and the receipt of the "lock out" signal is more than several seconds earlier in relation to another competitor's television signal which is delayed. During this period of time, for example, on a first or second down situation, a competitor receives the "lock out" just as the quarterback receives the snap and the corresponding television signal at the same time as the game producer while another competitor with a delayed television signal, receives a "lock out" signal while the quarterback is approaching the line of scrimmage. In another example, if the game producer is viewing a signal after a viewer, a competitor might see the quarterback start to drop back into a "shot gun" formation, making the likelihood of a pass considerably higher. This latter player might have time to change his prediction from, "run" to "pass" before receiving a "lock out" generated at the snap of the ball. A person consistently receiving a "lock out" later than another competitor might, through the course of the game, gain some competitive advantage.

While it is not clear that sufficient enough competitive advantage is gained between a competitor receiving his "lock out" signal precisely at the snap of the ball and one who is locked out a few seconds prior to the snap of the ball, this discrepancy could present the appearance of a playing field that is not level, and one of the primary benefits of the system addressed herein is to ensure the competitors feel they are on equal footing.

The above described issue is solved through a system and method to effectively equalize systemic propagation delay variances to a required level dictated by the demands and rules of a particular game, so that a material competitive advantage is not obtained and the user experience is optimized for all players.

The solution first relies on the determination of how each viewer is receiving their television signal (e.g. via an over the air broadcast in a metropolitan area, via a particular cable system or a particular satellite system). All subscribers to a particular service provider or who are receiving an over the air broadcast in a specific metropolitan area will receive the signal at their location at the same time. It is also able to be determined if there is further processing of the signal within the homes, office, bar and others, which could further increase the total length of the propagation delay. Examples would be the use of a DVR, such as TiVo™. A variety of methodologies are able to be utilized to determine the time difference between the reception of the television picture being utilized by the central game production facility where "lock out" signals are generated and each separate group of viewers around the country or around the world.

For this system, the total viewing population for a telecast is divided into segments or blocks of viewers referred to as "cohorts." For example, the 2 million inhabitants of the San Francisco Bay Area would be divided into approximately 1 over the air broadcast, 3 satellite independent providers and several cable "head ends" or central broadcast points serving a "cohort." This information would be gathered at a central game server, and all players registered to play in a particular contest would be assigned to a specific cohort of viewers.

The following are some methodologies for determining the delays experienced by various cohorts who are able to be used in combination or separately.

In one methodology, upon joining the service and prior to initial game play, subscribers and competitors are required to identify the method by which they receive their television signal and identify the cable or satellite service provider and answer questions relative to whether or not they subscribe to an analog or digital high definition service or utilize a DVR.

This information is able to be verified by sending questions to their cellular phones concerning commercials, station breaks and the precise time they are viewed or utilizing other information only seen by members of that cohort.

In another methodology, a routine is established upon entry into the game where the individual viewer is asked to mark the precise time a predetermined audio or visual event in the television program occurs, such as the initial kickoff, which would establish the deviation of their receipt of their television picture from the television signal utilized by the game producers. While some viewers might attempt to cheat by delaying their input, the earliest entries from the cohorts in this group would be averaged to establish the accurate delta between the receipt of the telecast by the production crew and those in each discrete sub group of viewers.

In another methodology, the GPS function in the cellular phone is used to determine the physical location of a viewer which is matched to a database of cable lead ends or over the air broadcast stations available to a consumer in that precise location.

In another methodology, employees of the game producer who are members of the subgroups which constitute the competitors/viewers, e.g. a subscriber to Comcast Cable in San Francisco, are utilized by the game service provider. These individuals would provide the current propagation delay information sent to the game server utilizing their identification of a recognizable event they observe on their television set, such as the initial snap of the ball.

In another methodology, audio or video artifacts or information done in cooperation with the television signal provider are inserted which must be immediately responded to by the competitor to verify the source of their television signal or monitored at cooperative viewers' television sets.

In another methodology, the various delays through an automated system linked to the game server, which continuously samples the audio or video track of the underlying satellite, cable or over the air broadcast television signals are established around the country to provide the information of the precise arrival of the underlying television picture.

Utilizing software resident in the game control server, game control data for each set of viewers/competitors of the game in progress who are receiving their television picture through the same source are batched together by the game control server, and the appropriate delay is either time stamped on the game "lock out" signals, or is imposed on the entire data stream so that competitors receiving their television information slightly behind or ahead of others gain no material competitive advantage. Another method is for the game control server to send all the game control data to all of the viewers/competitors of the game at the same time, and the client software is able to delay the presentation of the game data based on the viewers' cohort.

Utilizing these methodologies to measure the delays in each cohort, each cohort of viewers would have artificial time delays on the game control information imposed by the game control server, which would substantially equalize the receipt of "lock out" data relative to the event triggering the "lock out," based on the underlying television programming, for example, the snap of the football. Players receiving the television signals in advance of the one with the slowest receipt of the television signal would receive "lock out" signals slightly delayed or time stamped with a slightly later time as described in U.S. Pat. No. 4,592,546. By providing a correspondingly delayed lock out to a viewer receiving their signal later, a potential advantage is mitigated.

Alternatively, this time equalization from cohort to cohort could, for example, involve artificially delaying the transmission of the game control data stream sent to all competitors cell phones or other mobile devices by the appropriate amount of seconds, to sufficiently minimize the advantage a player with a few more seconds of television based information would have. For example, by time stamping the "lock out" signal at an earlier event, such as when the team breaks from the huddle, the chance of some cohorts seeing the actual beginning of the play is eliminated and the discrepancy in propagation delay provides little or no advantage.

FIG. 1 illustrates a flowchart of a process of preventing latency issues from giving an advantage to some participants. In the step 100, it is determined how each viewer receives a television signal, where possibilities include an over the air broadcast, a particular cable system or a particular satellite system. In the step 102, it is determined if there is additional processing of the television signal when after the signal enters a viewer/participant's house, office, bar or other location from an item such as a DVR. In the step 104, the viewers/participants are grouped into groups also referred to as cohorts. In the step 106, a delay amount is determined for each group. The delay amount is able to be determined by the one or more methods as described above. In the step 108, the viewers/participants are equalized. The methods of equalization vary, but some examples include time stamping on the game "lock out" signals, imposing a time stamp on the entire data stream so that competitors receiving their television information are slightly behind or ahead of others gain no material competitive advantage. Another method is for the game control server to send all the game control data to all of the viewers/participants of the game at the same time, and the client software is able to delay the presentation of the game data based on the viewers' group.

Arbitrarily Imposed Delays on the Broadcast of the Signal and the Physically Present Competitor As a result of the Janet Jackson half time show episode at the 2004 Super Bowl, some networks have announced their intentions to impose up to a 7 second delay on telecasts of live sporting events. More recently an obscenity uttered by a competitor at the conclusion of a live NASCAR race has resulted in another network announcing it may impose a 5-7 second delay on future broadcasts of NASCAR races. These arbitrarily imposed delays are a significantly longer duration than those resulting from the above described propagation delays of the broadcast television or cellular network control information.

A distinct advantage is able to arise for a game player who is physically present at an event being televised which is the basis of a contest of skill in the home, or other location, separate from the live game venue. This is because in certain instances they will receive "lock out" signals generated for competitors among the television viewing audience, particularly if the game producer is not physically present at the venue, but producing by viewing a telecast. This discrepancy would permit prediction entry as much as 7 seconds later than those watching an artificially delayed television picture. This magnitude of delay can result in a significant competitive advantage for the game player who is physically present. For example, a soccer or hockey contest of skill might contain an element where a competitor is given a limited number of opportunities to predict if there will be a "shot on goal" within the next 5 seconds. The 5 second advantage to the competitor physically present would be significant, because the receipt of a lockout signal generated for the huge television audience could occur after a shot had occurred.

In a contest based on a football game, a competitor present at the stadium would receive their "lock out" signals after the play was underway and could often determine whether the play was a pass or a run prior to receipt of the lockout signal. It is also likely that other live televised events such as The Oscars, Grammy's, beauty contests and other television programming that can support games of skill would impose delays on the telecast for the same or different reasons, also providing the opportunity for a competitive advantage for those who are attending the event in person.

The cellular telephone system currently has methodologies to determine a user's physical location. The 911 emergency laws mandate the cellular systems to have the capability of determining the location of a 911 emergency caller within 150 feet. More sophisticated approaches combine cellular site location technology with geosynchronous positioning satellite capabilities. Companies like Qualcomm™ have implemented various location technologies such as Snaptrack, SnapSmart and Snapcore, which provide a cellular phone's physical location within a matter of yards.

For each televised live event, the physical venue for this event would be known by the organizer of a game of skill in advance. Therefore, it is possible to determine for each contest of skill the specific cellular sites which will serve cellular phone owners physically present at that venue. A methodology is employed to identify all of the cellular phones logging into the game server registering to play the game of skill which are co-located within cellular sites servicing the stadium or auditorium where the televised live event is taking place. A communication methodology between the cellular carrier and the game control computer software contained in the game application resident on a game competitor's phone is able to be used, which would identify the cellular phone physically in the stadium.

Before the start of the contest of skill, the system informs the central computer of the game selected to be played by each competitor, for example, the San Francisco 49ers versus the New York Giants. The central game control server's software would hold current information on the physical location of the stadium of each game, for example, Candlestick Park in South San Francisco, and the cellular sites covering this location. The software resident on the cellular phone or on the server then identifies the phone as one located physically at the telecast game's venue.

To ensure that potential competitors at the live venue are able to also compete in a contest of skill, the central game server will separate the scoring data and game control data for competitors using these cellular phones in this specific location from the general pool of competitors who are not so located, but watching the game via television. A separate contest is then generated and scored for those competitors who have the advantage of viewing the event live, and a separate prize pool is awarded. This separate game would be produced though the observation of the actual game physically at the venue or through the operation of a non-delayed satellite feed.

If it is ultimately determined that certain groups of television viewers, as opposed to live event attendees, who are competitors in these games of skill are gaining sufficient enough competitive advantage, segregating those players at the extreme ends of the propagation delays, into two or more separate contests with separate sets of prizes, may also be employed as described above. For example, separate contests for satellite viewers versus cable and over the air viewers are able to be generated.

Figure 2:
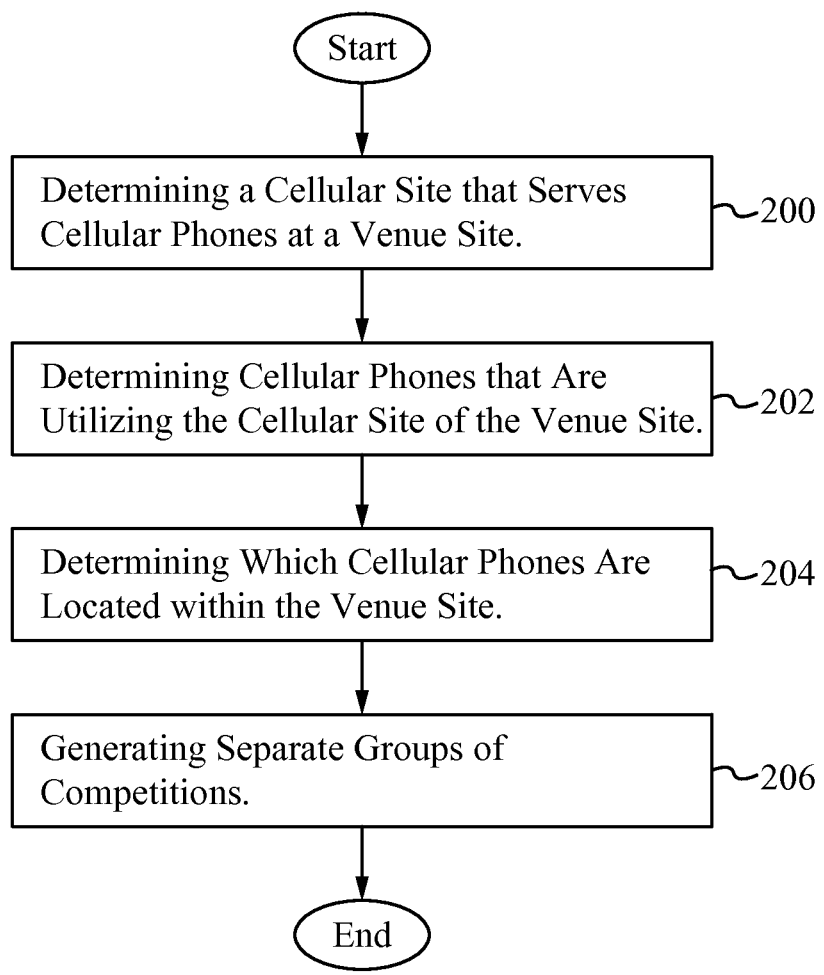
FIG. 2 illustrates a flowchart of a process of preventing participants at a live event from having an unfair advantage over participants watching on television.

FIG. 2 illustrates a flowchart of a process of preventing participants at a live event from having an unfair advantage over participants watching on television. In the step 200, a cellular site that serves cellular phones at a venue site is determined for each contest of skill. For example, if a game of skill is played for a game between the San Francisco 49ers and the Oakland Raiders at Candlestick Park in South San Francisco, a specific cellular site serves the cellular phones in that location. In the step 202, the cellular phones that are utilizing the cellular site of the venue site and are participating in the game of skill for that event are determined. For example, if there are 1,000 cellular phone users in Candlestick Park who register to play in a game of skill involving the 49ers and the Raiders, they are detected by the system. In the step 204, it is determined if the cellular phone is located within the venue site. The determination is made by comparing the current cellular information with information stored on a server indicating the location of each venue such as Candlestick Park. Based on the determination in the step 204, separate groups are generated in the step 206. A group is generated for users that are located at the live venue, and a group is generated for those players that are watching live on television. Therefore, the live players who do not experience any delay compete against each other, and television viewers compete with others television viewers who have a delay.

In addition to implementing the above-mentioned solutions to latency issues, additional groups are able to be generated if the delays between signal providers are not resolved. For example, all viewers with satellite television signals compete against each other, and all cable television viewers compete against each other, with no cross competition.

Taped and Syndicated Television Programs

A separate but related latency problem arises in the case of syndicated television shows, which are by necessity pre-taped. Examples are game shows like Wheel of Fortune™ and Jeopardy™. These pre-recorded television game shows are generally syndicated, meaning they are sold to a specific television station on an exclusive lease for the local television market served by the station's signal. The television stations generally air these half hour episodes at various times in "prime time access," which is generally considered between 6-8 pm. Therefore, with 3 different time zones in the United States, the start times will differ from market to market. In addition, the precise time each commercial bracketed television show segment that is broadcast is able to vary by a few seconds based on the time each station's engineering personnel starts the show's segments after the insertion of local and national commercials. Thus, for a show like Jeopardy™, there might be over 100 separate slightly different broadcasts from a time standpoint for a single episode of Jeopardy™ on a given day. In addition, these syndicated telecasts can also experience the same propagation delays as described above.

Contests of skill on cellular phones around these syndicated telecasts are produced with the cooperation of the game show producers, and game data files are produced which are precisely time-synchronized to the final video tape of the television game show. These files must be precisely synchronized and a delay of just a few seconds could give an unfair competitive advantage to a viewer who is receiving their "lock out" signal later than another competitor in a fast paced game like Jeopardy™. The game data files must be synchronized with the television show at the beginning of the program and again as the show returns to the game competition from each commercial break.

This solution addresses the separate, but related problems of synchronizing game data files with the broadcast of prerecorded and syndicated games, entertainment, reality or other television programming that is aired in different time zones at the choice of the purchasing television station. As opposed to live sporting events, the game production for this genre of programming is not done live through real-time observation of the unfolding telecast but is produced in advance with the cooperation of the show producer as a time synchronized file utilizing the final edited for broadcast, television program.

In general, the game data files are divided into separate "segments" which comprise the entire television program and aired between the insertion of national, regional and local advertising. As the television program returns from the opening commercials, the initial game or entertainment segment is launched by the game producer, synchronized to the playing of the television tape, and the data files for this segment would end with the first commercial break. The other game "chapters" are resynchronized as each segment of the telecast resumes from commercial break. The local telecasts might have variations of anywhere from 1 to 5 seconds, or more, resulting from the use of different commercials by different stations, and the variances in the local production by the engineering management of the syndicated telecasts.

A system first determines all of the separate and unique television markets where the cellular phone service will be offered in connection with a syndicated, taped version of an underlying television program, for example, Jeopardy™. Network broadcasts usually air in three separate time zones. This information is available from the shows syndicator, for example, Jeopardy™, the syndicator King World™ or Sony™, the show's licensor. This information is also publicly available through the various television guides. The game production servers hold the pre-produced game data files to be broadcast to the cellular phones of the participating subscribers, containing, for example, the correct answers and possibly some intentionally wrong multiple choice answers in the case of Jeopardy™ or other multiple choice based game shows. The server begins the broadcast of its time synchronized files for each discrete telecast of a single television program at a precise start point for each "segment" or chapter. With knowledge of the precise timing of the discrete segments of the broadcast, for each separate syndicated market, the server transmits the pre-recorded files in most cases, at a slightly separate and different time to each viewer who is viewing the telecast in a particular market via a particular broadcast, satellite or cable signal.

The precise start times of the beginning episode of a game show and the start times of the other segments, beginning as the show resumes after a national and local commercial are delivered to the server through various methodologies.

One methodology requires the cooperation of an employee of the game provider based on visual observation of the telecast for that market, utilizing a personal computer and the Internet, or by utilizing their local cellular phone, all coupled to the game server.

Another methodology includes utilizing an audio or video recognition system with online access to the broadcast of the underlying television program for each separate market which provides real-time tracking of the television broadcast to the game control server, ensuring the game data file is able to be precisely synchronized to the television picture. Information is also able to be inserted in a Vertical Banking Interval (VBI) of the taped syndicated show and tracked online in real time by the game control server. For remote telecasts and online connection from a remote device, reading data embedded in the VBI via a high speed connection to the central game server is utilized. Utilizing some of the procedures outlined above, the propagation delays in the receipt of the cellular transmissions are also monitored and the game server adjusts the data files containing the "lock outs" to accommodate the systemic delay in the delivery of the game data on the cellular networks.

Another methodology, with the cooperation of the producers of game shows, precise audio or video events in the telecast could either be added to the video, such as a visible count down, or existing events in the telecast identified by the producers as synchronization points which the competitors could utilize as start points for the previously downloaded data files at the press of an appropriate button on their cellular phone. This would trigger the launch of a program previously downloaded to the phone's RAM. Then, time synchronization would be launched.

One more methodology uses an audio signal, possibly sub-audible to humans, which is inserted into the taped audio track recognizable by the audio receiver in a cellular phone which would be utilized to start and/or continually keep the pre-produced data files resident on the cellular phone in synchronization with the telecast.

Figure 3:
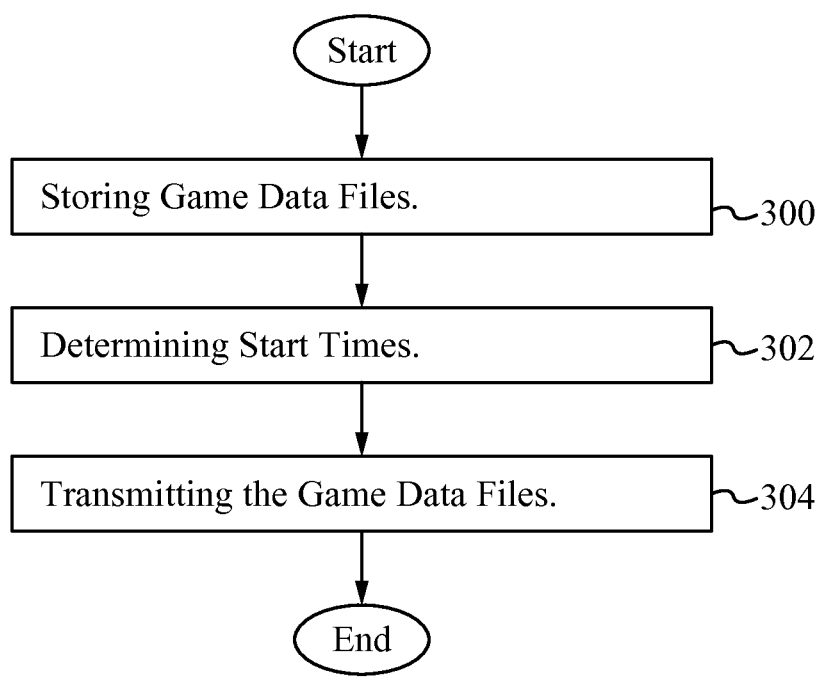
FIG. 3 illustrates a flowchart of a process of handling latency issues for taped programs.

FIG. 3 illustrates a flowchart of a process of handling latency issues for taped programs. In the step 300, pre-produced game data files are stored in servers; preferably, game production servers. The game data files include information required to participate in a game such as questions and answers for a trivia game like Jeopardy™. In the step 302, start times are determined for each discrete telecast of a show. The start times are determined as described above, such as with the cooperation of a game provider employee, utilizing an audio/video recognition system, using a visible count down or a recognizable signal which is able to be recognized by a cellular phone. Other ways of determining start times are possible as well. In the step 304, the game data files are transmitted at appropriate times based on the start times for each separate market. Furthermore, if additional delays are recognized, such as those delays described above, that is able to be accounted for.

Figure 4:
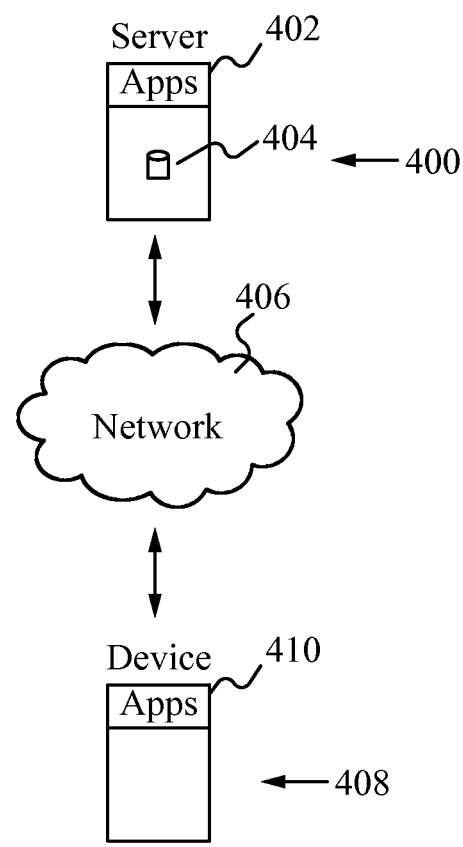
FIG. 4 illustrates a graphical representation of an embodiment of the present invention.

FIG. 4 illustrates a graphical representation of an embodiment of the present invention. A server 400 contains applications 402 and a storage mechanism 404. The applications 402 include an application to generate and modify game control data. The game control data is eventually transferred to users' cellular phones. If necessary the game control data is synchronized and time-stamped for each group, so that, as described previously, there are no unfair advantages for the competitors. A location application stored on the server 400 is able to determine which cellular phones are logged into the server 400 and what their location is. A grouping application is able to separate information such as scoring data and game control data into different groups. The grouping application also separates the cellular phones into groups or cohorts as described above. The storage mechanism 404 is utilized for storing the applications 402 in addition to selections and results. The storage mechanism 404 preferably includes a database for organizing the data including the selections, results, standings and groups amongst other data needed for executing the competitions. The server 400 is part of a network 406. A device 408 couples to the server 400 through the network 406. In some embodiments the network 406 includes the Internet. In some embodiments, the network 406 includes a cellular network. Also, in some embodiments, the network 406 includes both the Internet and a cellular network. The device 408 is preferably a cellular phone. In other embodiments a PDA, a computer, a laptop or any other device capable of communicating with the server 400 is possible. The device 408 stores a variety of applications 410. A game application is stored on the device 408. In some embodiments, software to identify the physical location of the device 408 is stored on the device 408. The device 408 also receives the game control data which ensures no competitors have an unfair advantage using the methodologies described above. Furthermore, the device 408 receives game data which is used to play the games. An example of game data includes Jeopardy™ multiple choice answers. Additional applications are able to be included on the server 400 and on the device 408, as necessary, for smooth operation of the games. Although some of the applications are described separately above, in some embodiments, the applications are included in one large application.

Figure 5:
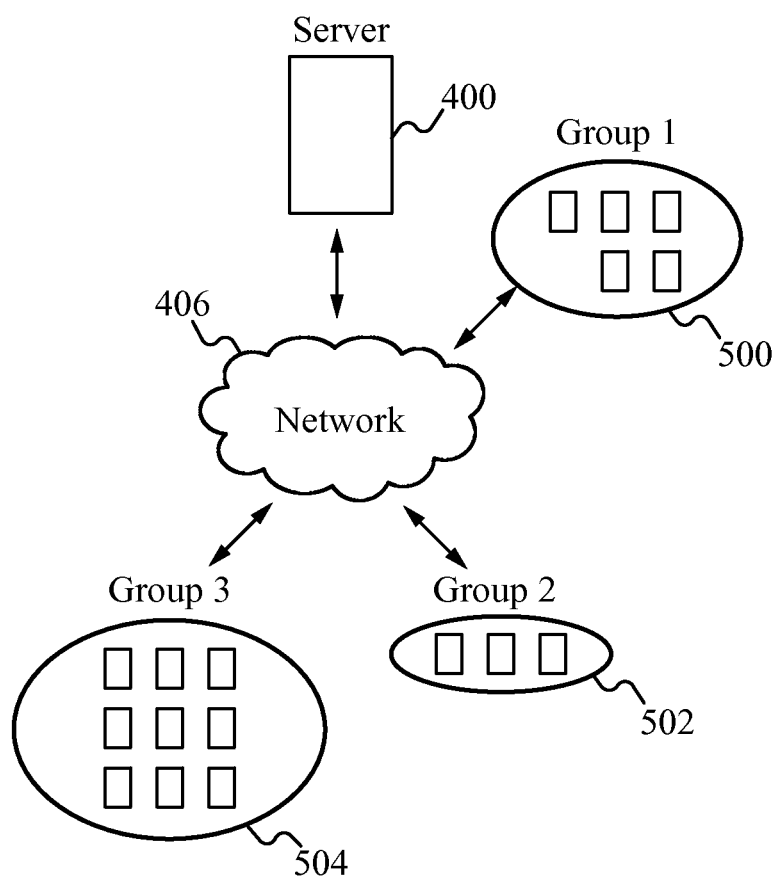
FIG. 5 illustrates a graphical representation of a network of devices of the present invention.

FIG. 5 illustrates a graphical representation of a network of devices of the present invention. A server 400 is coupled to many devices through a network 406. The devices are grouped into groups or cohorts as described above. For example, Group 1 of devices 500 includes a set of devices that receive a television signal through cable with a delay time of x. Group 2 of devices 502 includes a set of devices that receive a television signal through satellite with a delay time of y. Group 3 of devices 504 includes a set of devices that receive a television signal over the air with a delay time of z. Then, based on the delay times of each group, steps need to be taken to ensure these delays do not affect the ability of users to play a game of skill which corresponds to a live event shown on television. As described above, a lockout signal is sent at the appropriate time depending on the delay, or a lockout signal is sent, but included with the lockout signal is information for the lockout not to be implemented until the delay is accounted for. This ensures that users with different delays based on their television signal reception path do not receive advantages or disadvantages. Furthermore, in addition to the delays being related to the type of signal reception path such as cable versus satellite, the delays could also be related to other aspects of the signal reception path such as the location of the receiving television or the type of equipment that one television company uses versus another.

To utilize the methods and systems described herein, for the most part, a participant in a game of skill playing on his/her mobile device does not have to perform any different actions when playing a standard game of skill without the methods and systems described herein. The user simply plays as usual except that with the methods and systems described herein, users with faster or slower connections do not receive any advantages or disadvantages. In embodiments which require user input, the user performs an action, such as recognizing an event to synchronize the game with a live or taped event. For game producers, the methods and systems described herein able to be implemented automatically or performed manually. Automation includes technology to automatically determine the start of an event such as automatically detecting the start of a football game. Manual implementation requires a person to watch an event and respond to that event such as watching a football game and noting when the first play occurs in order to synchronize the "lock out" signal appropriately.

In operation, the methods and systems described herein are able to synchronize separate games of skill which have different latencies based on television signal reception differences, random delays and/or other delays. For live events where all of the participants are watching the event on television and participating in a game of skill corresponding to that live event, delays related to the television signal reception differences have to be handled. Television signal reception differences occur because some televisions receive the live event signal via satellite, while others have cable and still others have something else. The signals do not arrive at the participants at the same time. Therefore, to ensure fair competition, participants are separated into groups or cohorts based on delivery system type, location and other parameters that affect the timing of the signal. Then, using a mechanism described above, the delay for each group is determined. Based on that determined delay, the game of skill is able to be configured with the appropriate timing for a lock out signal, so that each participant has the same amount of time to select an answer and also sees the same amount of the live event as others before the lock out occurs.

For games of skill where there are both participants attending the event live and watching it on television which typically has a few seconds delay, the participants are separated into different competitive groups wherein the attending participants are in one group and the television viewing participants are in another group.

For games of skill using tape recorded events like game shows, the important aspect is ensuring the game of skill corresponds with the televised recorded event. For example, if the game of skill were off by a few seconds, participants could receive multiple choice answers to the wrong questions. Therefore, the methods and systems described herein ensure that the game of skill is synchronized with the taped televised event even when there are different latencies depending on how and where the television signal is being displayed.

Furthermore, although the methods of handling latency have been described above as handling a specific scenario such as delays in television signal reception, the methods are able to be used in conjunction with each other as well. For example, when participants are separated into attending and televised groups because some participants are actually attending an event while others watch it on television, for those watching it on television there will still be issues from location to location and based on the television signal reception, so the latency balancer which handles that aspect of latency is also able to be implemented.

To encourage viewer participation, games, contests and social interactions are able to be synchronized with programming such as television shows or commercials utilizing a second screen such as a cell phone, iPad® or laptop computer. The programming is able to be television programming, Internet programming (e.g. a video displayed on a webpage or mobile device) or any other programming. The gaming is able to be any game such as a game of skill or chance, for example, a scavenger hunt or a treasure hunt.

In some embodiments, the programming and the gaming, contests or social interactions are displayed on a single screen. For example, Google TV™, Apple TV® or another IPTV includes a broadband connection which is capable of connecting to a website which is a companion site to the programming. The display on the television is able to include a Picture-in-Picture (PIP), display space near or around the telecast's picture (e.g., an L-shaped space), graphic overlay, or a split screen. In another example, a two-screen experience includes a wi-fi connection, an open wireless technology (e.g., Bluetooth®) or any other connection from the television to a tablet device such as an iPad®. In some embodiments, a computing device contained within the television couples to a server via the Internet, where the server stores files, displays, graphics, gaming information and/or any other information to be synchronized with the programming, and the application is separately displayed on the same screen for user interaction with the game or contest utilizing a controller for the television.

In a scavenger hunt game, a contest might be based on a member collecting items in a scavenger hunt fashion which appear in TV programs or commercials. The first person or teams to collect all of the items or collecting the most points wins.

In a treasure hunt game, clues to items to collect are given which make sense only upon the viewing of a commercial or program. A viewer enters an item (e.g. from multiple choice options), and the first to accumulate all of the items wins. Hereinafter, all references to a viewer are understood to include a single viewer or a team or teams of viewers. The teams are able to be formed through social networks or on an ad hoc basis. Exemplary formations of teams are able to be found in U.S. Pat. No. 8,002,618 which is hereby incorporated by reference in its entirety. For example, teams are able to be formed and then play any game or contest such as a scavenger hunt, treasure hunt or bingo. The players on each team are able to work jointly or separately to collect items and perform other game play actions.

For example, a treasure hunt game based on the entertainment content or TV commercials provides the first item to search for: "Old English Sheep Dog with red collar." The application in the game mode records an input such as a press of a screen or button by a viewer the instant they observe the dog appear on the TV screen in connection with a participating show or commercial. Executing the required input at this precise time would validate that indeed THE Old English Sheep Dog had been collected. In another version, a score of 1000 points would rapidly be decremented beginning when a treasure hunt object appeared in a TV show or commercial. A rapid input would get 990 points, and someone who had spent time to find their phone might get 450 points for a slower response. The points are decremented incrementally, exponentially or in any other manner.

The viewer receives a prize upon the accumulation of a designated level of points, or in a money contest such as a $1 Million national contest, the first viewer to achieve a designated point's level wins the grand prize.

In another example of a game, a bingo-like game is presented where, instead of letters and numbers being used for a player's board, each player's board includes specific objects, characters, events or other items contained in a commercial, television series, show, event or other programming. The items are each collected by pressing a button within a prescribed amount of time (e.g., 5 seconds) of appearance of the object on the television. The first person to fill the card wins. Filling the card is able to mean filling the card fully or any other bingo-related definition of filling such as achieving a vertical, horizontal or diagonal line. For example, a player's card includes 25 slots, arranged in a 5×5, grid with items such as a Ford F-150, a Ford F-250, a Ford Focus, a Ford Mustang, an engine, and twenty other items. When the player watches a Ford commercial, the player sees a Ford Focus. The player then presses a button within the allotted time, and that slot in his board is filled. Each player's board is monitored, and when it is determined that a player has achieved a filled board, the player is declared the winner. In some embodiments, the other players are notified, and the game ends, and in some embodiments, additional winners are able to be determined (e.g. second and third place).

The system implements precise synchronization of a second screen and programming. The synchronization is able to be implemented using any methodology, such as utilizing the teachings of latencies. Exemplary methodologies for synchronizing have been described herein and any other methodologies of synchronizing are possible.

Figure 6:
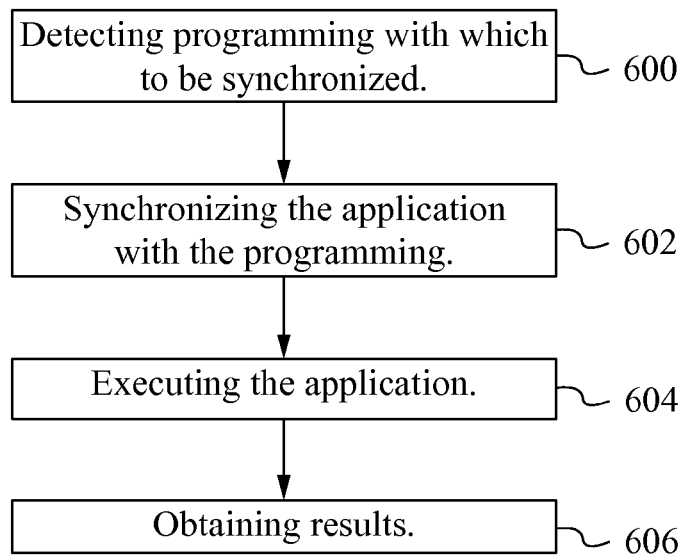
FIG. 6 illustrates a flowchart of a method of implementing a game synchronized with programming according to some embodiments.

FIG. 6 illustrates a flowchart of a method of implementing a game synchronized with programming according to some embodiments. In the step 600, an application detects programming with which to be synchronized. In the step 602, the application synchronizes with the programming to provide application data such as gaming data. In the step 604, based on user responses, the game is executed. For example, a scavenger hunt game, treasure hunt or other game based on the observation of something contained in a television broadcast game is executed. In some embodiments, in the step 606, scores are tallied, prizes are awarded and/or other results are obtained. In some embodiments, the order of the steps is modified. In some embodiments, fewer or more steps are implemented.

Detection and synchronization are able to be implemented in any manner. The efficacy of the games depend on each player having an opportunity to obtain the maximum number of points achievable by entering their input as soon as possible after the specified item appears on the TV screen. The following provides examples of detection and synchronization. Existing events in the telecast are used as synchronization points or start points for previously downloaded data files to a mobile client, as well as a watermark, fingerprint not detectable by the viewer. A synchronization point is a visible or audible event located within the telecast. A synchronization point for a live telecast is contained in audio or video within the telecast. Information is inserted in a Vertical Blanking Interval (VBI) or digital equivalent of a show and tracked online in real-time. Information is embedded in the telecast and tracked online in real-time. Determining a start time of the telecast includes using a recognizable signal recognizable by a mobile device. A start time of a commercial is delivered using a recognizable signal recognizable by a mobile device. A plurality of synchronization points are used by a client to continuously check to ensure pre-produced data files are synchronized with the telecast. Inserted audio or video is used to continuously check to ensure the pre-produced data files are precisely synchronized on the client with the telecast. Inserted audio or video is used by a client to continuously check to ensure the pre-produced data files are precisely synchronized on the client with the telecast. The inserted audio or video is used by a server to continuously check to ensure the pre-produced data files are precisely synchronized on the client with the telecast.

In some embodiments, synchronizing includes determining an amount of delay to precisely synchronize between the game stored on a mobile device and the receipt of the program presented on a television and substantially equalizing presentation of the game of skill or chance with programming or a commercial contained in a telecast through adjustment for the amount of delay of the telecast. Substantially equalizing includes equalizing receipt of lock out events relative to a televised event triggering a lock out. Synchronizing includes substantially equalizing a participant delay to ensure the participants each receive the game of skill or chance at substantially the same time. Synchronizing includes determining participant latency based on specific participant latencies and synchronizing the game of skill or chance for each of the participants. Synchronizing includes utilizing an audio or video recognition system on a client with online access to the telecast's game control server. Synchronizing includes using added audio or video events in the telecast as synchronization points. A plurality of synchronization points within audio or video are used by software on a client in connection with a server to continuously monitor the telecast to ensure the game of skill or chance played on the client is precisely synchronized with the telecast. An artifact is inserted into the telecast recognizable by an audio receiver in a mobile device which is utilized to start and continually keep the game of skill or chance synchronized with the telecast.

Participants include ad hoc or preexisting groups of friends competing in a separate competition in disparate physical locations. The synchronization points are the audio or video data for the telecast residing on a server online with a mobile device. The participants constitute ad hoc or existing groups of geographically dispersed friends participating in a separate game of chance or skill. The participants are ad hoc or previously organized groups of friends competing against each other in a separate contest. Equalizing the participants includes time stamping the amount of delay on game-related data. Establishing the amount of delay is through an automated system which samples an audio or video track of a satellite, cable or over the air broadcast television signal, linked to a game server, to provide information related to a precise arrival of an underlying television picture.

Figure 7:
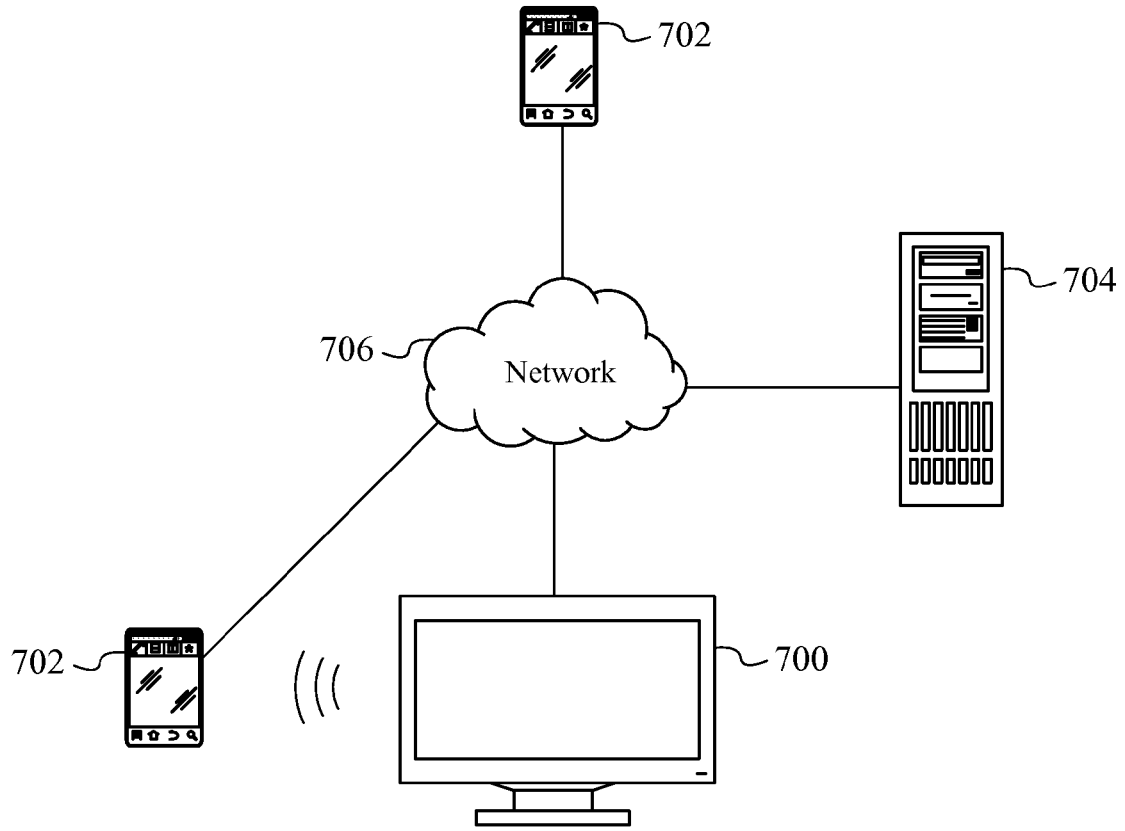
FIG. 7 illustrates a system for implementing a game synchronized with programming according to some embodiments.

FIG. 7 illustrates a system for implementing a game synchronized with programming according to some embodiments. The system includes several devices such as a viewing device 700, a secondary device 702, a server device 704 and a network 706. For example, a user views programming on the viewing device 700 (e.g. a television) and participates in a scavenger hunt game on the secondary device 702 (e.g. a smart phone). The game on the secondary device 702 is synchronized with the programming of the viewing device 700. In some embodiments, the synchronization takes place using a program on the secondary device 702, and in some embodiments, the server device 704 is used for synchronization. The network 706 is able to be any network such as the Internet, a cellular network or a combination of networks. Fewer or additional devices are able to be included within the system.

To utilize the synchronized gaming and programming, a user initiates a game which automatically synchronizes with the programming. In some embodiments, the programming initiates the game. For example, a user is watching television and a trigger in the television signal automatically starts the game. The user plays the game as any game would be played. For example, if the user is playing a scavenger hunt game, the user searches/looks for items and indicates when the items are found. If the user is playing a treasure hunt game, the user uses clues to locate an item. Points and/or prizes are awarded based on the timing of the user input/selections (e.g. a faster response receives more points than a slower response).

In operation, the synchronized gaming and programming is able to synchronize programming with a game presented on a second device. In some embodiments, the synchronized gaming and programming is also able to synchronize participants, for example by equalizing the amount of delay or sending a lockout signal at the appropriate time based on the amount of delay.

Although a scavenger hunt and a treasure hunt have been described herein, any other game is able to be played in conjunction with programming.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of synchronizing a game or contest with programming, the method programmed in a memory of a device comprising:
 a. detecting programming with which to be synchronized; and
 b. initiating an application to run simultaneously with the programming; wherein the game or contest is based on the observation of an object or audio or visual event within a television program or commercial, and an execution of an entry on a second screen within a pre-prescribed period of time; and wherein the pre-prescribed period of time relies on an accurate synchronization of television and user input which relies on a clock of a second screen being synchronized with a television clock.

2. The method of claim 1 wherein the programming comprises at least one of a television program and a commercial.

3. The method of claim 1 wherein the application comprises a scavenger hunt game.

4. The method of claim 3 wherein the scavenger hunt game comprises users collecting items which appear in the programming by selecting each item within a specified period of time starting from the appearance within a telecast of each item.

5. The method of claim 4 wherein the scavenger hunt game is played in groups of teams.

6. The method of claim 1 wherein the application comprises a treasure hunt game.

7. The method of claim 6 wherein the treasure hunt game comprises:
 a. presenting clues to users of items to collect, wherein the clues are related to the programming; and
 b. providing a submission mechanism for users to submit the items.

8. The method of claim 7 wherein the treasure hunt game further comprises awarding a prize to a user of the users to collect all of the items first.

9. The method of claim 7 wherein the treasure hunt game further comprises awarding points based on response time with the points decreasing with a passage of time beginning with a first appearance within a telecast.

10. The method of claim 9 wherein the treasure hunt game further comprises awarding a prize to a user with a highest point total or upon reaching a designated point total.

11. The method of claim 6 wherein the treasure hunt game is played in groups of teams.

12. The method of claim 1 wherein points awarded decrement beginning with a first appearance of the object or event.

13. The method of claim 1 wherein the programming and the application are synchronized using a first clock on a television and a second clock on a mobile device.

14. The method of claim 1 wherein the programming and the application are synchronized using watermarking or fingerprinting.

15. The method of claim 1 wherein an amount of points awarded in the application is variable depending on a speed of input by a user.

16. The method of claim 1 wherein an amount of points awarded in the application begins at a maximum number of possible points and decreases incrementally as time passes.

17. The method of claim 1 wherein an amount of points awarded in the application begins at a maximum number of possible points and decreases exponentially as time passes.

18. The method of claim 1 wherein the programming is displayed on a first device and the application is run on a second device.

19. The method of claim 1 wherein detecting occurs on a second device.

20. The method of claim 1 further comprising obtaining results.

21. The method of claim 20 wherein obtaining the results includes awarding points based on selections by a user.

22. The method of claim 20 wherein obtaining the results includes awarding prizes based on selections by a user.

23. The method of claim 1 wherein existing events in the programming are used as synchronization points as start points for previously downloaded data files to a mobile client.

24. The method of claim 1 wherein a synchronization point is a visible or audible event located within the programming.

25. The method of claim 1 wherein a synchronization point for a live telecast is contained in audio or video within the programming.

26. The method of claim 1 wherein information is inserted in a Vertical Blanking Interval (VBI) or digital equivalent of a show and tracked online in real-time.

27. The method of claim 1 wherein information is embedded in the programming and tracked online in real-time.

28. The method of claim 1 wherein detecting programming includes using a recognizable signal recognizable by a mobile device.

29. The method of claim 1 further comprising delivering a start time of a commercial using a recognizable signal recognizable by a mobile device.

30. The method of claim 1 wherein a plurality of synchronization points are used by a client to continuously check to ensure the application is synchronized with the programming.

31. The method of claim 1 wherein inserted audio or video is used to continuously check to ensure application is precisely synchronized on a client with the programming.

32. The method of claim 31 wherein the inserted audio or video is used by a client to continuously check to ensure the application is precisely synchronized on the client with the programming.

33. The method of claim 31 wherein the inserted audio or video is used by a server to continuously check to ensure the application is precisely synchronized on the client with the programming.

34. The method of claim 1 wherein an artifact is inserted into the programming recognizable by an audio receiver in a mobile device which is utilized to start and continually keep the application synchronized with the programming.

35. The method of claim 1 wherein the programming and the application are displayed on a single screen.

36. The method of claim 35 wherein the single screen includes displaying the application in a picture-in-picture display, an L-shaped space or a graphic overlay.

37. The method of claim 35 wherein a computing device contained within the device couples to a server via the Internet, wherein the server stores files and displays to be synchronized with the programming, and wherein the application is separately displayed for user interaction with the game or contest utilizing a controller for the device.

38. The method of claim 1 wherein the programming is displayed on a television, further wherein the television comprises a wi-fi connection or an open wireless technology to a secondary device to display the application.

* * * * *